United States Patent
Cossairt et al.

(10) Patent No.: US 8,675,125 B2
(45) Date of Patent: Mar. 18, 2014

(54) MINIMIZED-THICKNESS ANGULAR SCANNER OF ELECTROMAGNETIC RADIATION

(75) Inventors: Oliver Cossairt, Cambridge, MA (US); Gregg E. Favalora, Arlington, MA (US)

(73) Assignee: Parellel Consulting Limited Liability Company, Dover, DE (US)

( * ) Notice: Subject to any disclaimer, the term of this patent is extended or adjusted under 35 U.S.C. 154(b) by 1462 days.

(21) Appl. No.: 11/380,296

(22) Filed: Apr. 26, 2006

(65) Prior Publication Data

US 2006/0244918 A1 Nov. 2, 2006

Related U.S. Application Data

(60) Provisional application No. 60/675,165, filed on Apr. 27, 2005.

(51) Int. Cl.
*H04N 13/02* (2006.01)
*H04N 5/225* (2006.01)
*G03B 21/56* (2006.01)

(52) U.S. Cl.
USPC ............... 348/373; 348/59; 348/51; 359/446

(58) Field of Classification Search
USPC ......................... 348/59, 373; 353/7
See application file for complete search history.

(56) References Cited

U.S. PATENT DOCUMENTS

| | | | |
|---|---|---|---|
| 3,125,927 A | * | 3/1964 | Erban ........................... 359/446 |
| 3,881,810 A | | 5/1975 | Colao |
| 4,070,089 A | | 1/1978 | Grafton |
| 4,078,854 A | | 3/1978 | Yano |
| 4,107,712 A | | 8/1978 | Law |
| 4,317,618 A | | 3/1982 | Murakoshi |
| 4,390,239 A | | 6/1983 | Huber |
| 4,456,783 A | | 6/1984 | Baker |
| 4,468,115 A | | 8/1984 | Lao |
| 4,502,751 A | | 3/1985 | Fjeldsted et al. |
| 4,698,498 A | | 10/1987 | Mahoney et al. |
| 4,853,769 A | | 8/1989 | Kollin |
| 5,392,140 A | | 2/1995 | Ezra et al. |
| 5,465,175 A | * | 11/1995 | Woodgate et al. ............ 359/463 |
| 5,546,120 A | | 8/1996 | Miller et al. |
| 5,930,037 A | | 7/1999 | Imai |
| 6,008,484 A | | 12/1999 | Woodgate et al. |
| 6,061,179 A | * | 5/2000 | Inoguchi et al. .............. 359/464 |
| 6,061,489 A | | 5/2000 | Ezra et al. |
| 6,487,020 B1 | * | 11/2002 | Favalora ....................... 359/619 |
| 6,624,919 B2 | | 9/2003 | Lambert |

(Continued)

OTHER PUBLICATIONS

Edward A. Watson. "Analysis of beam steering with decentered microlens arrays". Optical Engineering. 32 Nov. 1993, No. 11, Bellingham, WA, US. pp. 2665-2670.

(Continued)

*Primary Examiner* — Joel Fosselman
(74) *Attorney, Agent, or Firm* — Amin, Turocy & Watson, LLP

(57) ABSTRACT

A minimized-thickness angular scanner of electromagnetic radiation includes an optical sandwich having a two-dimensional (2D) image source, and a scanning assembly that includes a first optic and a second optic, wherein at least one of the first optic and the second optic are oscillatorily translating. Translation of the optics provides for generation of a three-dimensional (3D) image, while the optical sandwich design provides for compact implementation of 3D displays.

35 Claims, 11 Drawing Sheets

(56) References Cited

U.S. PATENT DOCUMENTS

| | | | |
|---|---|---|---|
| 6,806,851 B2 | 10/2004 | Shimoyama et al. | |
| 7,050,020 B2* | 5/2006 | Uehara et al. | 345/6 |
| 7,277,226 B2 | 10/2007 | Cossairt et al. | |
| 2003/0210461 A1* | 11/2003 | Ashizaki et al. | 359/443 |
| 2005/0146787 A1* | 7/2005 | Lukyanitsa | 359/462 |
| 2005/0248972 A1* | 11/2005 | Kondo et al. | 365/125 |
| 2006/0202910 A1* | 9/2006 | Cha et al. | 345/6 |

OTHER PUBLICATIONS

Edward A. Watson. Implementing Optical Phased Array Beam Steering with Cascaded Microlens Arrays. 2002. pp. 1429-1436.

International Search Report for PCT/US2005/020441. Mailed Nov. 8, 2005.

M. Edward Motamedi. "Miniaturized micro-optical scanners". Optical Engineering. 33Nov. 1994, No. 11, Bellingham, WA, US. pp. 3616-3623.

Jesse B. Eichenlaub. A multiperspective look around autostereoscopic projection display using an ICFLCD. Part of the IS&T/SPIE Conference on Steroscopic Displays and Applicatoins X. San Jose, California. Jan. 1999. SPIE vol. 3639. pp. 110-121.

Michael Halle. "Autostereoscopic Displays and Computer Graphics". Computer Graphics. May 1997. pp. 58-62.

IBM Technical Disclosure Bulletin. "Autostereoscopic 3-D Image Display Device". vol. 37 No. 12 Dec. 1994. pp. 177-178.

Siegmund Pastoor. "An Experimental Multimedia System Allowing 3-D Visualization and Eye-Controlled Interaction without User-Worn Devices". IEEE Transactions on Multimedia, vol. 1, No. 1, Mar. 1999. pp. 41-52.

Akihito Nakai, "A Stereoscopic Display with a Vibrating Microlens Array". Department of Informatics, Faculty of Engineering, The University of Tokyo. pp. 524-527.

M C Hutley, "The use of microlenses for making spatially variant optical interconnections" Pure Appl. Ot. 1 (1992) 337-346. Printed in the UK.

Motoaki Kawazu. "Application of gradient-index fiber arrays to copying machines". Apr. 1, 1980/ vol. 19, No. 7/ Applied Optics. pp. 1105-1112.

Byoungho Lee, "Theoretical analysis for three-dimensional integral imaging systems with double devices". Applied Optics/ vol. 41, No. 23/ Aug. 10, 2002. pp. 4856-4865.

Vesselin Shaoulov. "Design and assessment of microlenslet-array relay optics". Applied Optics/vol. 42, No. 34/ Dec. 1, 2003. pp. 6838-6845.

R.H. Anderson. "Close-up imaging of documents and displays with lens arrays". Feb. 15, 1979/ vol. 18, No. 4/ Applied Optics. pp. 477-484.

H. Hoshino, "Analysis of resolution limitation of integral photography". vol. 15, No. 8/Aug. 1998/ J.Opt. Soc. Am. A. pp. 2059-2065.

Neil Davies. "Three-dimensional imaging systems: a new development". Applied Optics/ vol. 27, No. 21/ Nov. 1, 1988. pp. 4520-4528.

Shaoulov. "Compact microlenslet-array-based magnifier". Apr. 1, 2004/ vol. 29., No. 7/ Optics Letters. pp. 709-711.

Vikuiti Advanced Light Control Film (ALCF-P). 3M Innovation. 3 pages.

\* cited by examiner

Vertical
Diffuser 315

MINIMIZED-THICKNESS ANGULAR SCANNER OF ELECTROMAGNETIC RADIATION

CROSS REFERENCE TO RELATED APPLICATION

This application claims priority to U.S. Provisional Patent Application No. 60/675,165, filed Apr. 27, 2005, the entire disclosure of which is hereby incorporated by reference.

STATEMENT REGARDING FEDERALLY SPONSORED RESEARCH

The U.S. Government may have certain rights in this invention pursuant to Grant No. 70NANB3H3028 awarded by the National Institute of Standards and Technology (NIST).

BACKGROUND OF THE INVENTION

Compact, wide-angle radiation-steering devices are valuable in fields such as information display, optical communications, and laser-steering. The electromagnetic radiation can be of any frequency, such as visible radiation or infrared. The embodiments discussed in this disclosure pertain to three-dimensional (3D) image display, particularly to view-sequential autostereoscopic three-dimensional display.

One class of methods for producing the perception of an "aerial" 3D image is known as multi-view autostereoscopic display. These methods typically create 3D imagery, visible to the unaided eye (i.e. they do not require the use of polarized glasses), created by projecting multiple depictions of the desired scene as rendered from a series of viewpoints, usually as rendered by a computer-graphic camera moving along a horizontal track.

3D displays have taken many forms, such as parallax panoramagrams which use lenticular display elements ("lenticules") or parallax barriers to spatially demiultiplex and steer light from an image surface to one or more viewing regions. Lenticules may be bi-convex, or made of multiple surfaces, and may alternatively be long, thin lenses having a flat surface on one side and an opposing curved surface, forming a plano-convex lens. When viewed, the lenticule may provide a view angle-dependant striped or sliced portion of an image positioned behind each lenticule (i.e., the slice that is viewable is dependent upon the angle from which the viewer views the image).

Therefore, arrays of lenticules can be used to create a parallax effect wherein different views or slices of total images are apparent from different viewing angles. In this way, a 3D effect can be achieved if the components of a 3D image are successfully rendered as separate slices, presented at the image surface as spatially multiplexed views, and are viewed through a lenticular array in a parallax maimer.

The lenticular array concept has been used to create "no 3D glasses required" or "autostereoscopic" displays. Typically, such displays use a sheet array of lenticular lenses to steer interdigitated left, intermediate and right eye views to a properly positioned observer.

Lenticular 3D displays techniques deserve their own category because they have earned a competitive place in the commercial market. However, the number of views they are capable of displaying is usually limited because they employ spatial—multiplexing, whereby the resolution of the display is sacrificed to include parallax information. The minimum pixel size is consequently a limiting factor in these displays. Interactive electronic flat panel 3D displays have been developed based on these techniques.

For example, StereoGraphics Corporation (San Rafael, Calif.) sells the SynthaGram™ flat panel monitor series which is a lenticular-based 3D display. The SynthaGram series ranges from XGA (1024×768 pixel) to UXGA (3840×2400 pixel) monitors, and employs a custom fabricated diagonal lenticular screen which divides pixels into 9 different views. The monitor is driven by the DVI data output of a graphics card. The lenticular screen is designed to eliminate moire fringing, which can occur in lenticular flat panel screens, and divides pixels on the RGB level.

The drawback of existing lenticular 3D displays, and all spatially-multiplexed multi-view 3-D displays, is that by definition they trade off the projector's spatial resolution for the number of views displayed. The number of views is also limited by the shape of the lenticular elements and the pixel size. To date lenticular displays have produced at most 12 views. Furthermore, existing lenticular displays have typically been implemented using components that are relatively large or stationary, and do not support mobile operation.

A requirement common to view-sequential displays is beam steering, which can be performed by a rotating mirror, a translating transparent column on a black background in the system's Fourier plane, or other methods.

Several applications, such as mobile graphics visualization (i.e. quasi-holographic aerial imagery projected from a mobile phone or portable media device) and desktop 3-D visualization, require the 3-D display to be "thin."

What is needed is a compact radiation steering device that is amenable to mobile operation (such as in a handheld device) that consumes and emits less power that prior art approaches. Preferably, the radiation steering device can be fabricated from low-cost components and is useful in tight spaces.

SUMMARY OF THE INVENTION

Disclosed is a display apparatus for projecting a three-dimensional (3D) image, including a two-dimensional (2D) image source; a first optic; a second optic that is oscillatorily translatable; wherein the 2D image source, the first optic and the second optic form an optical sandwich.

Also disclosed is a method for providing a 3D image, the method including: operating a display apparatus for projecting a three-dimensional (3D) image, having a two-dimensional (2D) image source; a scanning assembly having a first optic and a second optic that is oscillatorily translatable; wherein the illumination assembly, the spatial light modulator the first optical array and the second optical array form an optical sandwich; providing a series of viewpoints to the display apparatus; controlling the spatial light modulator; and controlling the scanning assembly to simultaneously display the series of viewpoints and thus provide the 3D image.

Further disclosed is a computer program product stored on machine readable media, the product comprising instructions for providing a 3D image, the instructions including instructions for operating a display apparatus for projecting a three-dimensional (3D) image, having a two-dimensional (2D) image source; a scanning assembly comprising a first optic and a second optic that is oscillatorily translatable; wherein the illumination assembly, the spatial light modulator the first optical array and the second optical array form an optical sandwich; providing a series of viewpoints to the display apparatus; controlling the spatial light modulator; and controlling the scanning assembly to simultaneously display the series of viewpoints and thus provide the 3D image.

BRIEF DESCRIPTION OF THE FIGURES

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Disclosed herein is a compact radiation-steering device using an optical sandwich for providing a three dimensional (3D) display. Implementation of the optical sandwich provides for certain advantages over existing designs. For example, several applications, such as mobile graphics visualization (i.e. quasi-holographic aerial imagery projected from a mobile phone or portable media device) and desktop 3D visualization, require the 3D display to be "thin." The teachings herein provide for several "thin" radiation-steering devices, each referred to as a "compact 3D display."

The compact 3D display as well as the methods for use thereof provide benefits that include, among other things, image generation that is amenable to mobile operation and may be implemented in handheld devices. The compact 3D display typically consumes and emits less power than other techniques for producing 3D images. Advantageously, the compact 3D display can be fabricated from low-cost components and also fit into tight spaces.

The compact 3D display provides, in general, a compact form for steering electromagnetic radiation to produce a display of the 3D image. The following discussion explains the concept as it pertains to the compact 3D display.

Figure 1:
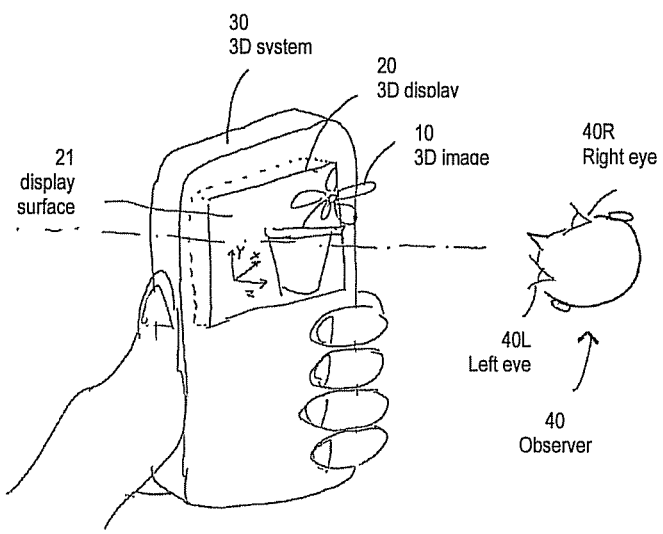
FIG. 1 is a perspective view of an embodiment of a handheld 3D display.

FIG. 1 illustrates a 3D image (10) that is a quasi-holographic image projected by a compact radiation steering device, referred to as the compact 3D display (20). The compact 3D display (20) is incorporated into a 3D system (30). Exemplary implementations of the 3D system (30) include a handheld media device, a mobile telephone, a personal digital assistant, an automotive dashboard mapping system, a global positioning system (GPS) receiver, a personal gaming device, an MP3 player, a personal video player, a notebook computer (i.e., laptop) and other similar systems.

In an exemplary embodiment, the compact 3D display (20) is about 4.0" (102 mm) in width by about 2.0" (50.8 mm) in height. In this embodiment, the 3D image (10) extends about 1" (25.4 mm) into the 3D display (20) and about 1" (25.4 mm) out of the 3D display (20), for a total depth of the 3D image (10) is about 2" (50.8 mm). In some embodiments, such as where a high degree of quality control is used during fabrication of the beam-steering optics, the total depth of the 3D image (10) is about 4" (101.6 mm).

Typically, the compact 3D display (20) comprises a rectangular display having a diagonal dimension of about 1" (25.4 mm) up to about 24" (610 mm). A variety of image aspect ratios may be used as considered desirable (e.g., a 16:9 ratio).

In this exemplary embodiment, a two-dimensional (2D) image source, has a measurement of about 4.0" (101.6 mm) by about 2.0" (50.8 mm). Exemplary aspects of the 2D image source might include an array of about 1,000 pixels by about 500 pixels, thus providing a pixel pitch of about 0.004" (102 μm), which is about 250 pixels per inch.

In a typical embodiment, and as illustrated in FIG. 1, an observer (40) perceives the 3D image (10) because the observer's left eye (40L) sees a different image than the observer's right eye (40R). Typically, the display surface (21) repeatedly projects about 30 to about 100 sets of ray trajectories (also referred to as "views"). The views can typically be seen by the observer (40) from a variety of viewpoints. For simplicity, FIG. 1 only depicts two views.

FIG. 1 depicts a display surface (21), which is defined for mathematical convenience, and is the surface from which rays emanate. FIG. 1 also depicts a coordinate system, in which the x and y axes are coplanar to the display surface (21) and the z axis is normal to the display surface (21). In a horizontal-parallax-only mode, the x axis is parallel to the horizon and to the line connecting the observer's pupils.

Figure 2:
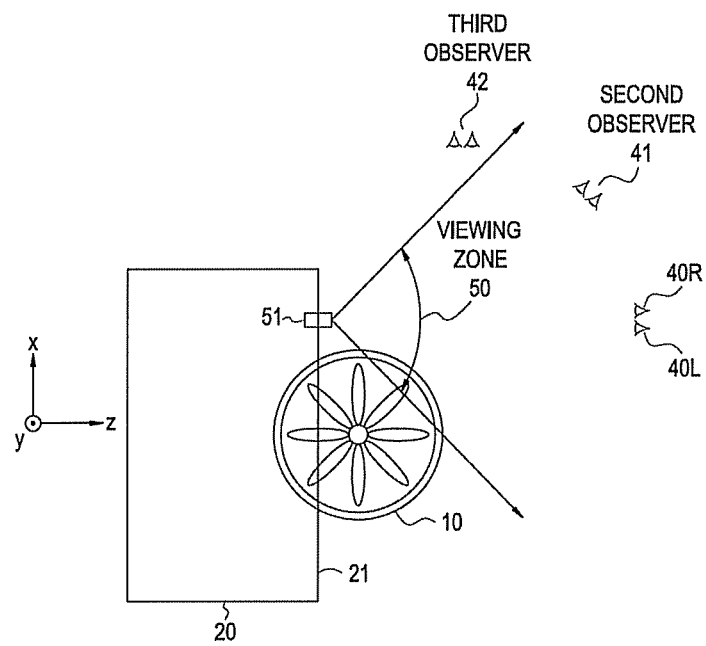
FIG. 2 is a top view of an embodiment of a handheld 3D display.

FIG. 2 provides a top view of the situation depicted in FIG. 1. Again, a 3D scene (10) is projected from the display surface (21) of the 3D display (20). An approximate measure of the horizontal viewing angle of the 3D image (10) is a viewing zone (50). Here, the horizontal angular extent of the horizontal viewing zone (50) is defined as the radiative angular extent of a typical pixel (51) in a plane parallel to the xz plane. Here, the 3D image (10) is visible to the first observer (40) and a second observer (41) but not to a third observer (42).

So far the discussion has assumed the 3D display (20) provides a horizontal-parallax-only (HPO) display. It may instead be a full parallax display, in which case a vertical viewing zone could be defined and would have vertical parallax viewing qualities.

Figure 3:
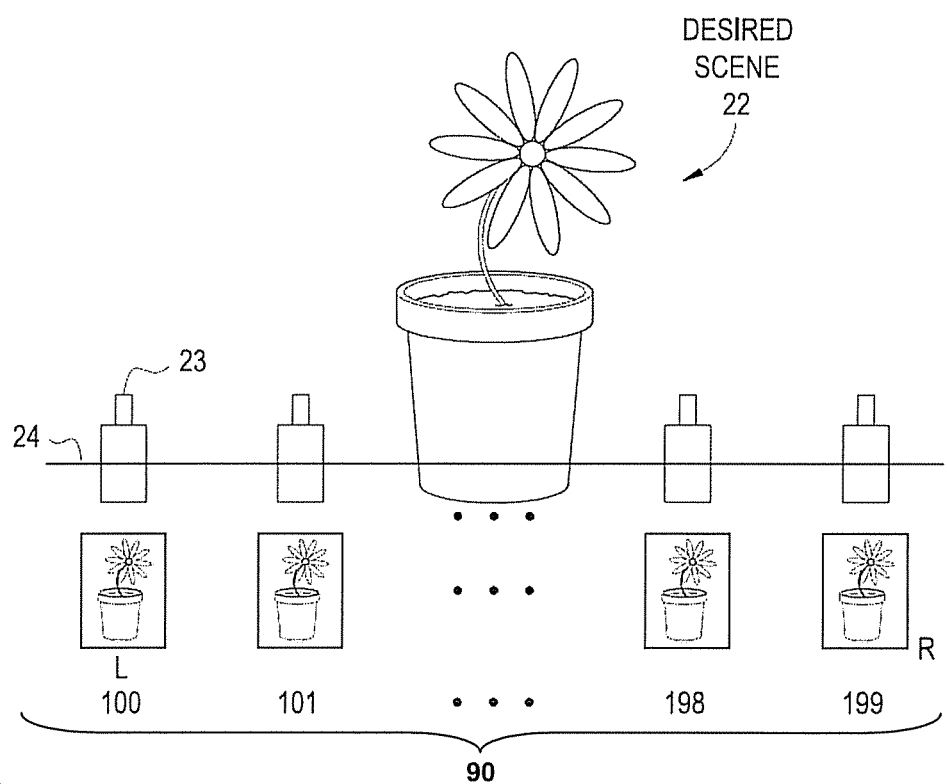
FIG. 3 is a diagram of a system for recording viewpoints.

FIG. 3 illustrates a generalized process for computing and depicting 3D images (10) using a multi-view methodology. Projection of multi-view 3D images typically follows several steps. First, view-specific data are acquired from a set of physical or computational (synthetic) "cameras." For example, in FIG. 3, a desired scene (22) of a flower in a flowerpot is illustrated. A series of computer-graphic cameras (23) compute the appearance of the desired scene (22) from a multitude of positions along a horizontal track (24). Typically, about 30 to about 200 viewpoints are rendered and form a series of viewpoints (90). In this example, a leftmost image (100) and a rightmost image (199) are depicted. Images between the leftmost image (100) and the rightmost image (199) are represented by numbers between (100) and (199), wherein the reference numbers are representative of succession in the series of viewpoints (90). Playback or reconstruction of the desired scene occurs when the 3D display (20) projects rays of visible light to several locations.

Figure 4:
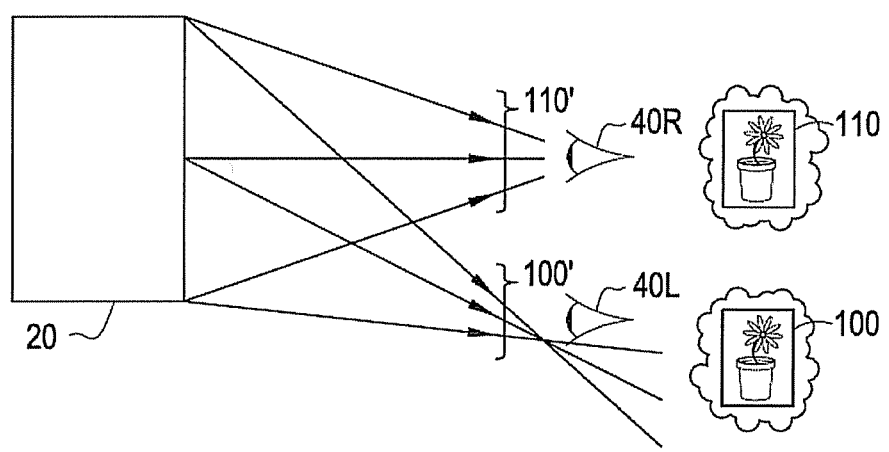
FIG. 4 depicts aspects of 3D image formation using the 3D display.

In this example, and with reference to FIG. 4, the left most image (100) is projected by a ray bundle (100'), an intermediate depiction (110) is projected by a ray bundle (110'). In this case, bundles (100') and (110') each meet at an apex, or pupil when an observer places his left eye (40L) at the pupil formed by bundle (100') and his right eye (40R) at the pupil formed by bundle (110'), he sees images (100) and (110). As a result, the observer perceives a floating 3D image in the vicinity of the 3D display.

Figure 5:
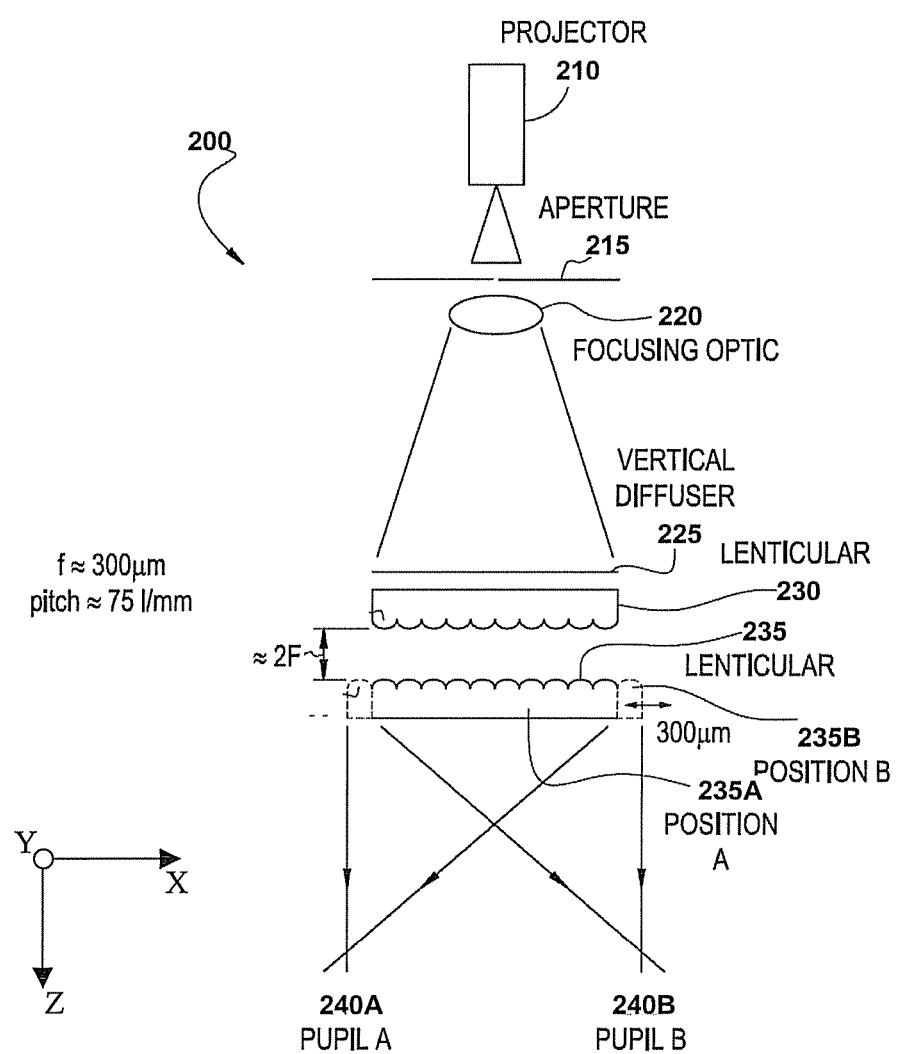
FIG. 5 depicts aspects of a projector based system for generating 3D images.

FIG. 5 illustrates an embodiment of a view-sequential 3D display (20). The embodiment depicted is disclosed in the pending U.S. patent application Ser. No., 11/146,749, filed Jun. 7, 2005, published Dec. 8, 2005 as publication no. 2005/0270645 A1, the disclosure of which is incorporated herein by reference in its entirety.

In the embodiment of FIG. 5, a 3D projection system (200) includes a first lenticular lens array (230) and a second lenticular lens array (235), at least one of which undergoes low-amplitude reciprocating translational movement to effect scanning. As depicted, the second lenticular lens array (235) is subject to the translational movement.

Figure 15:
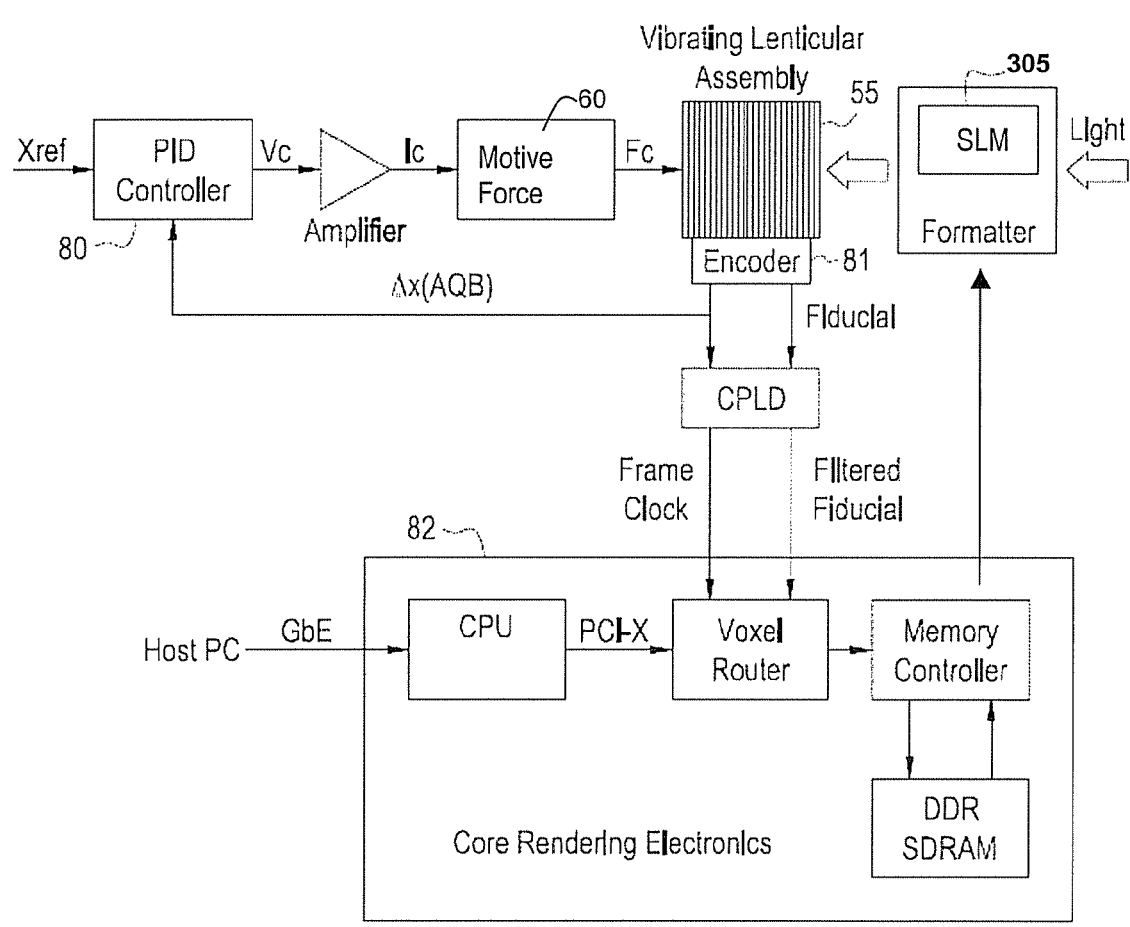
FIG. 15 depicts exemplary components for operation of the compact 3D display.

In this embodiment, a projector (210) that projects the series of viewpoints (80) for a desired 3D image (10) is provided. The projector (210) is typically controlled by standard electronics (aspects of which are depicted in FIG. 15). Preferably, the projector (210) is capable of frame rates in excess of 5,000 frames per second. One exemplary projector (210) being a ferroelectric liquid crystal micro-display available from DisplayTech (Colorado, USA). An aperture (215), in the form of a column that is oriented parallel to the y-axis, is placed in front of the projector (210). A focusing optic (220) re-images each viewpoint from the series of viewpoints (80) to the surface of a vertical diffuser (225) (or, optionally, to a Fresnel lens (222)). Note that as used in this embodiment, "vertical" corresponds to the orientation of the y-axis. Other components may be included as deemed suitable (such as, for example, polarizing and "analyzing" components).

The light passes through the first lenticular lens array (230) and subsequently the second lenticular lens array (235). Typically, a lens pitch is approximately 75 lenses per mm, and a focal length is approximately 300 microns for each of the first lenticular lens array (230) and the second lenticular lens array (235). A distance D between the lenticular lens arrays is approximately 600 microns (about 2 F), as measured from the "tops" of the lenticular lenses in each array. Scanning motion is performed by rapidly translating the second lenticular lens array (235) back and forth, with a travel path of about 300 microns. This results in scanning light across a wide field, from a pupil A (240A) to a pupil B (240B). It is important that the scanning motion be synchronized to the series of viewpoints projected by the projector (210). When that occurs, any observer within the viewing zone of the 3D display (200) will perceive a 3D image.

Figure 6:
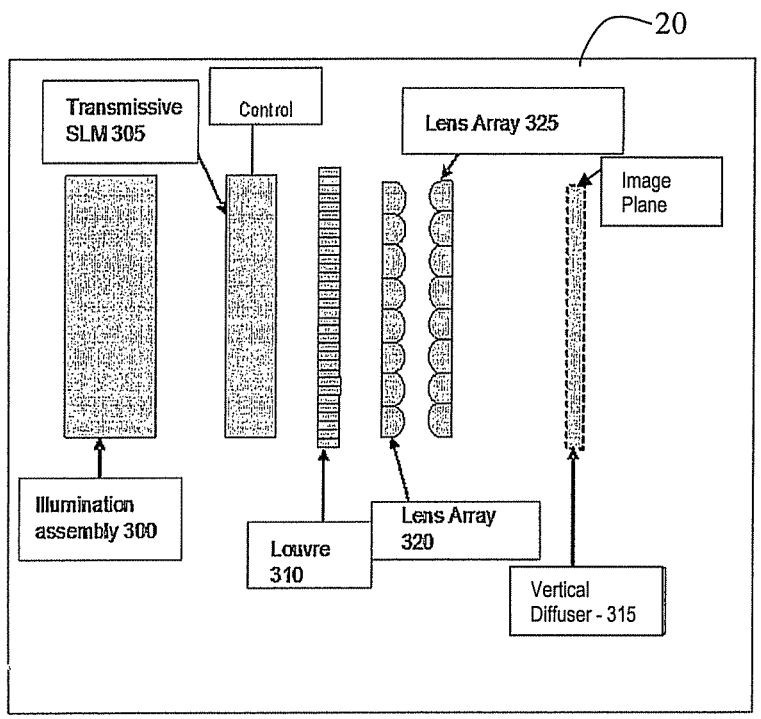
FIG. 6 is a schematic view of an embodiment for a compact 3D display.

The teachings herein incorporate aspects of U.S. patent application Ser. No., 11/146,749, while providing for certain advancements and distinct advantages. Reference may be had to FIG. 6.

In FIG. 6, various components are used to provide for compact implementation of the 3D display (20). In the embodiment depicted, an illumination assembly (300), such as a backlight, illuminates a transmissive spatial light modulator (SLM) (305) as the two-dimensional (2D) image source. In some embodiments, the light passes through an array of invisible microlouvers (310) that function like vertical blinds, a vertical diffuser (315), and a scanning assembly that includes a first lenticular lens array (320), and a second lenticular lens array (325). In this embodiment, the second lenticular lens array (325) is an oscillatory translating lenticular lens array. It should be noted that a variety of embodiments for the 2D image source may be realized.

The fundamental image-generating component is the spatial light modulator (SLM) (305). This SLM (305) can be an emissive array such as an Organic LEDs (OLED) display panel, an array of micro-emitters such as lasers (e.g., vertical cavity surface emitting lasers, or VCSELs), a reflective display, a transreflective display, or other radiation-emitting module. If the image-generating component is a reflective display, it may be illuminated using methods well-known to those skilled in the field of microdisplay system engineering (refer to FIG. 14).

It should be recognized that use of or reference to the spatial light modulator SLM (305) is a non-limiting and merely exemplary embodiment. More specifically, one skilled in the art will recognize that the SLM (305) modulates incident light into patterns, while an emissive array may be used to directly create the patterns. In either case, and regardless of technique, the 2D image source provides for generation of a 2D pattern. Accordingly, the teachings herein are not limited to the apparatus disclosed herein in regard to the 2D image source and may include other devices as practicable.

An exemplary embodiment for the microlouvers (310) are Vikuiti Light Control Films model numbers LCF-P 98-0440-2658-3 and ALCF-P 98-0440-4264-0, available from 3M Corporation (Minneapolis, Minn.).

A variety of components may be used as the 2D image source. A non-limiting example includes an emissive array of Organic LEDs (OLEDs), which deliver thin, power efficient and bright displays with fast switching speeds). Other non-limiting examples include a spatial light modulator (e.g., a transmissive LCD panel, typically a transmissive ferroelectric LCD panel in combination with associated polarizing filters and analyzing filters). Exemplary OLED arrays include those available from Samsung Corporation, Emagin Corporation of Bellevue Wash., Kodak Corporation of Rochester, N.Y. and Universal Display Corporation of Ewing N.J., while exemplary LCD-based light modulators include those available from Displaytech Ltd of Colorado and Fourth Dimension Displays (formerly CRL Opto), of Fife United Kingdom. LCD light based modulators may further be used in conjunction with other illumination systems, such as color LED backlighting.

Exemplary commercially available lenticular lens arrays include those available from Anteryon International B.V. and Microlens Technology, Inc. Exemplary commercially available components for use as optional diffusers and vertical diffusers include those available from Physical Optics Corp. and Dai Nippon Printing Co. Ltd of Japan.

For the exemplary embodiment, the 3D display (20) employs a refresh rate where scanning (i.e., oscillatory translation of at least one of the lens arrays) would occur left-to-right or right-to-left at a frequency of about 60 Hz. In this embodiment, the 3D display (20) uses a screen that is about 500 pixels by about 1,000 pixels, generates about 30 "views"

per quasi-holographic image, and has total image depth of about 4" (10.16 mm, rounded to 10 mm) using 256 colors.

Multi-color illumination is provided by the OLED array if OLEDs are used for the 2D image source. If non-emissive modulators are used, the illumination will typically use off-the-shelf components. For example, near-eye displays might use switched LED illumination—cycling red, green, and blue LEDs to illuminate the 2D image source. That is, one skilled in the art will understand that the illumination assembly (300) may be arranged to provide a variety of predetermined wavelengths.

The lenticular lens arrays would typically have the same size and shape as the 2D image source. For the exemplary embodiment, the lenslets have a focal length of about 800 microns and a lens pitch of about 300 microns. The lens pitch does not have to equal the source pixel pitch. The lens array is usually fabricated from a sheet of glass, and is therefore at least about 0.5 mm thick to about 1.0 mm thick. That is, the lens array is about as thick as its focal length, and usually abuts or nearly abuts the 2D image source.

In this embodiment, the lens arrays translates about 125 microns back and forth. If the array moves too far, the first lens array will bleed unwanted light into an adjacent lens to a primary receiving lens on the second lens array, forming unwanted ghost images in the output. It should be that techniques are disclosed herein for controlling this problem.

If an optional barrier array (also called an "aperture array") is used, the barrier array will typically have a pitch equal or approximately equal to the 2D image source pixel pitch (i.e., the pitch in the SLM (305)). That is, each pixel will be covered by a translucent window that limits the aperture of the pixel. This correlation serves two purposes. The correlation limits crosstalk between pixels thereby preventing ghost images. This has the benefit of increasing the contrast of the image and therefore improving the depth of the 3D image. Second, apertures are commonly used to prevent the effects of lens aberrations making 3D images crisper, at the expense of loss of brightness.

For a number of embodiments, a vertical diffuser (315) is optional. An exemplary embodiment for a vertical diffuser (315) includes those available from Physical Optics Corporation of Torrance, Calif. Typical embodiments for the vertical diffuser (315) have a horizontal beam spread of approx. 0.1 degrees and a vertical beam spread of 90 degrees. In some embodiments, the vertical diffuser (315) is placed as close as possible to the spatial light modulator (305) in order to minimize blur in the 3D image (10) associated with each pixel.

Typically, the first lenticular lens array (320) and second lenticular lens array (325) are separated by approximately 2 F (1.6 mm).

Figure 7:
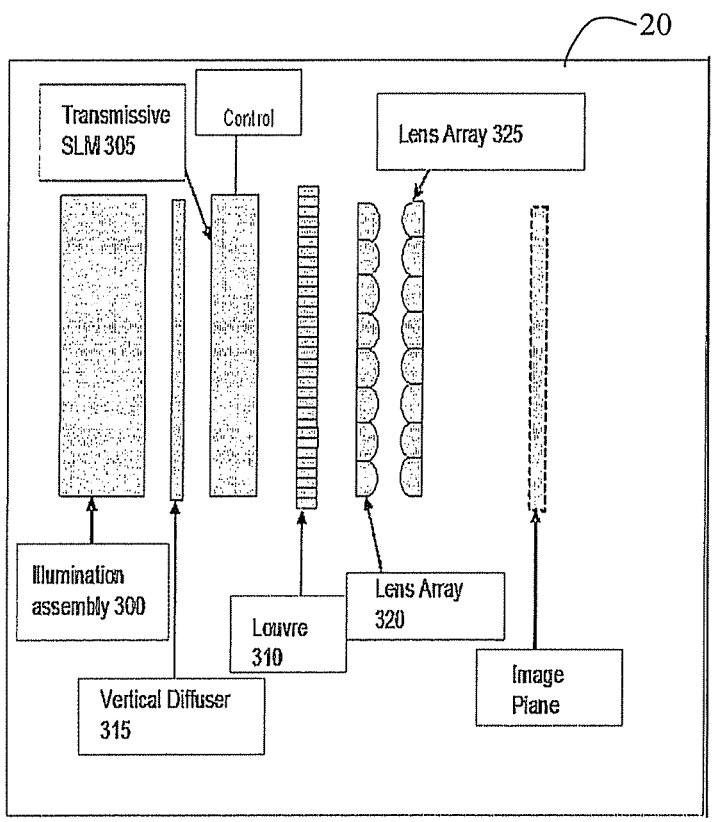
FIG. 7 is a schematic view of another embodiment for a compact 3D display.

The "optical sandwich" that typically includes the components of FIG. 6, can be made "thin." For example, the optical sandwich that provides for the 3D display (20) is typically on the order of about 30 mm. Accordingly, the 3D display (20) is ideally suited for a variety of mobile applications. Translation of the lenticular can be performed by a number of techniques, such as the use of a flexure stage. FIG. 6 depicts an embodiment useful for a lenticular based system, while FIG. 7 depicts another embodiment for implementing a hemispherical lens array or "fly's eye" system (refer to FIG. 11).

With reference to an "optical sandwich," the components of the 3D display (20) are substantially close to each other or in contact with one another, and may, in some respects, be considered layers or substantially similar to layers. That is, substantial distances, such as distances between components for focusing or providing for other optical properties are generally not required. For example, the distance between the projector (210) and the scanning assembly is not called for. It should be noted that at least some distance between components of the optical sandwich may be required. For example, in the case of a translational lenticular lens array, at least some distance between a stationary lenticular lens array may be called for (e.g., to provide for unrestricted translation thereof). In this regard, the optical sandwich provides for the 3D display (20) having a minimized thickness.

Figure 8A:
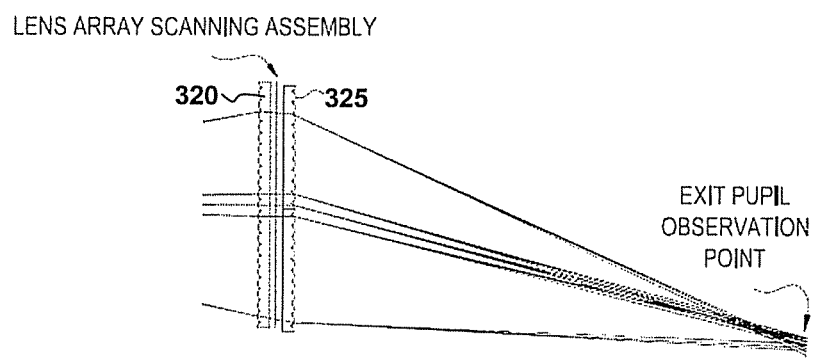
FIG. 8A and FIG. 8B, collectively referred to herein as FIG. 8, depict aspects of a pupil forming mode and a telecentric mode, respectively.
Figure 8B:
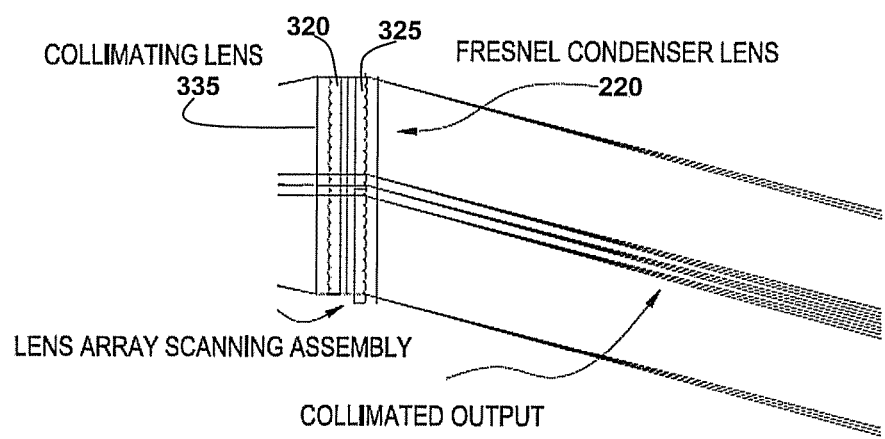
Figure 9A:
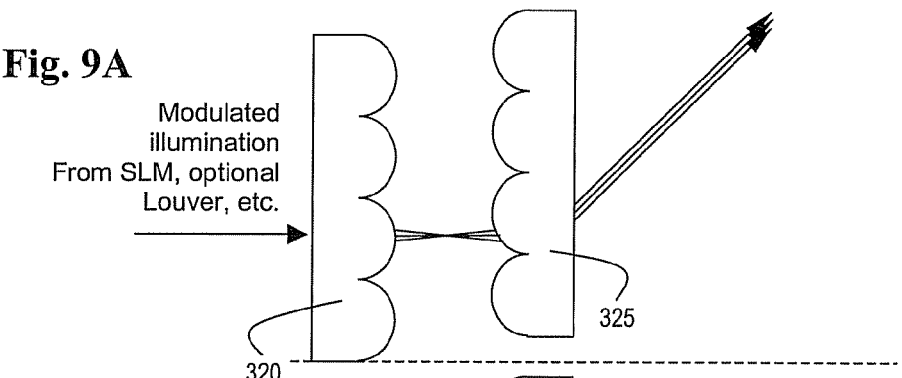
FIG. 9A through FIG. 9D, collectively referred to as FIG. 9, depict aspects of collimation with translation of a second lenticule.
Figure 9A:
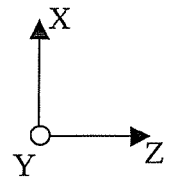
Figure 9B:
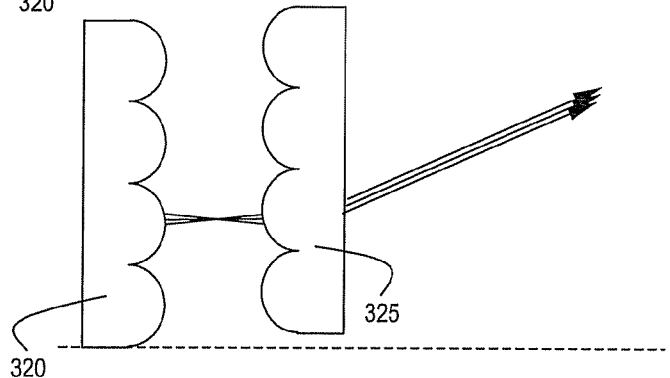
Figure 9B:
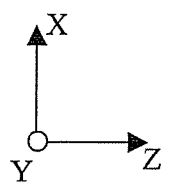
Figure 9C:
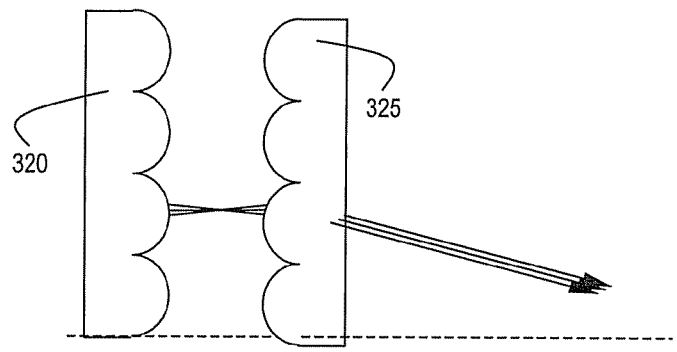
Figure 9C:
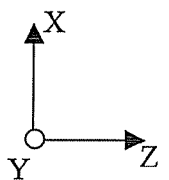
Figure 9D:
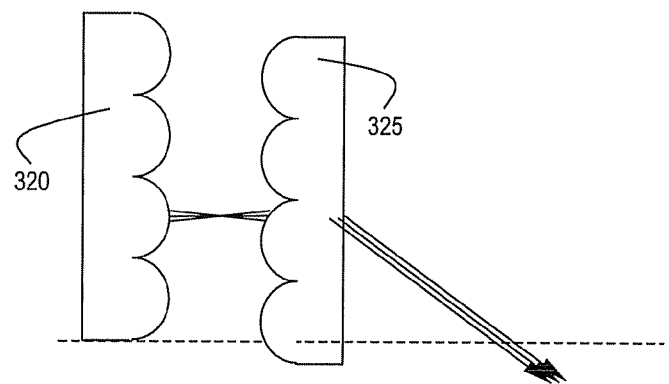
Figure 9D:
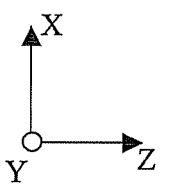

Note that the 3D system (30) may be constructed such that, for a given instant in time, the ray bundles (100', 110') do not converge (i.e., meet at an apex or pupil) but alternatively travel together in a mutually "collimated" (i.e., telecentric) manner. In this alternative, at various instants in time, ray bundles exit the display surface 21 having different trajectories, so that aggregated over the persistence of vision, pupils do form at the locations shown. FIG. 8A and FIG. 8B, collectively referred to herein as FIG. 8, depict aspects of image forming using the alternative techniques of a "convergence mode (i.e., the "pupil forming mode") and a "telecentric mode," repectively Referring to FIG. 8, aspects of the optics for the convergence mode and the telecentric mode are depicted. In FIG. 8A, a ray diagram is presented wherein the ray bundle converges at a location. In FIG. 8B, another ray diagram is presented wherein a collimated beam is produced and the resulting beam "sweeps" the viewing zone 50.

FIG. 9A through FIG. 9D depicts aspects of the telecentric mode, wherein articulation of the second lenticular lens array (325) provides for redirecting the ray bundle (depicted as the grouped arrows). Various inputs to the first lenticular lens array (320) may be used, including modulated illumination from the spatial light modulator (305), output from optional microlouvers (310), and others. FIG. 9 generally depicts extrema for the ray bundle. In this example, the arrangement of the first lenticular lens array (320) and the second lenticular lens array (325) provide for an f-stop of about 800 μm while the pitch is about 300 μm and the translational lens movement includes a horizontal translation of about 125 μm.

Note that in FIG. 9, oscillatory translation of the second lenticular lens array (325) occurs in an X direction (as depicted). In a further embodiment (see FIG. 11), oscillatory translation occurs in the X direction and a Y direction. Note that although translation may occur in the Z direction (along a main optical path), such translation is not considered oscillatory and typically for purposes other than scanning. For example, translation in the Z direction may be undertaken for focusing of the 3D image (10) or improving aspects of the viewing zone (50). In short, oscillatory translation generally occurs in at least one direction that is not along the main optical path.

Further, note that in FIG. 9, a one-to-one correspondence exists for lenses in the first lenticular lens array (320) and the second lenticular lens array (325). One skilled in the art will recognize that this is merely illustrative and not a limitation. In other embodiments, other ratios of lens populations may exist (e.g., 1.5:1, 2:1, etc, . . . ).

Figure 10:
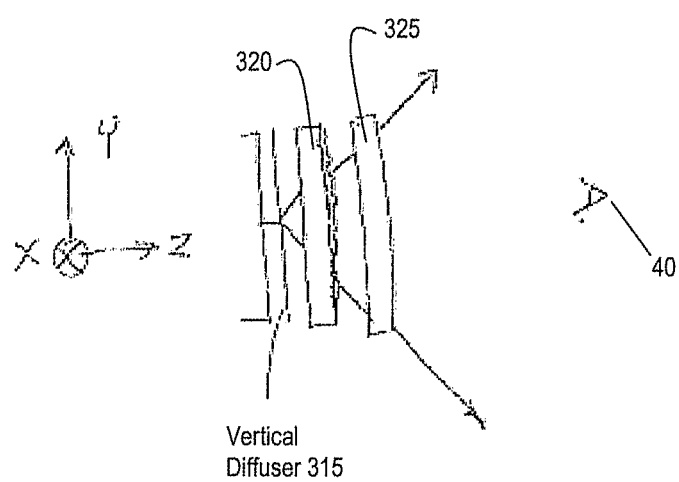
FIG. 10 depicts a role of a vertical diffuser.

FIG. 10 provides an illustration of the role of the vertical diffuser (315). In FIG. 10 a side view of the scanning assembly depicts a vertical diffusion of the ray bundle when considered with reference to the observer 40.

One skilled in the art will recognize that articulating both the first lenticular lens array (320) and the second lenticular lens array (325) may be used to provide for a greater viewing zone 50 when compared to articulation of a single element.

Figure 11:
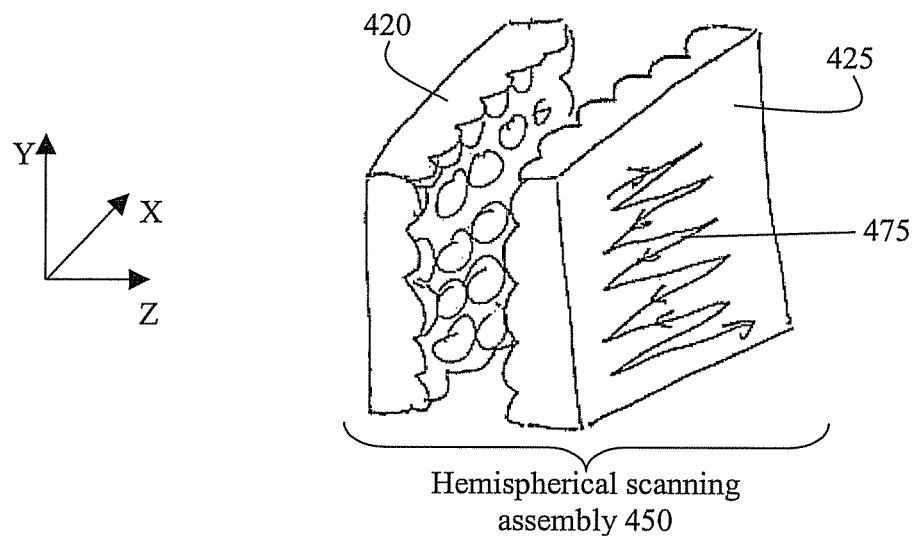
FIG. 11 depicts aspects of complimentary hemispherical lens arrays.

It may be said that the articulation of the optical components (e.g., the first lenticular lens array (320) and the second lenticular lens array (325)) are oscillatorily translatable. That is, whichever optical component is used for scanning will typically translate in a manner that is considered to be substantially equivalent to oscillation. Oscillatory translation may occur in any pattern deemed suitable. For example, in some embodiments, translation is merely horizontal. In other embodiments, translation follows a certain pattern. Reference may be had to FIG. 11.

Referring to FIG. 11, aspects of another embodiment of a scanning assembly are shown. In the embodiment of FIG. 11, both the first lenticular lens array (320) and the second lenticular lens array (325) are replaced with a first hemispherical lens array (420) and a second hemispherical lens array (425), respectively. The first hemispherical lens array (420) and the second hemispherical lens array (425) forming a hemispherical scanning assembly (450). Note that in common parlance, each "hemispherical lens array" is referred to as a "fly's eye" array.

The hemispherical scanning assembly (450) may be used advantageously to provide for full-parallax 3D displays (or equivalently two-axis beam steering). Clearly, the first hemispherical lens array (420) is in optical communication the second hemispherical lens array (425). Scanning can be achieved by moving the first hemispherical lens array (420), second hemispherical lens array (425), or both lens arrays (420, 425).

The oscillatory translating of the optical elements may follow any one or more of a horizontal path, a vertical path, a zig-zag path and a circuitous path (meaning any other type of path desired). For example, FIG. 11 depicts a zig-zag path for the oscillatory translation.

Use of the hemispherical scanning assembly (450) provides for further advantages in that a scanning path 475 may include a vertical component (y axis) as well as the horizontal component (x axis).

In other embodiments, optical elements used in the scanning assembly include, without limitation, lenticular elements, holographic optical elements (HOE), at least one irregular lens array, a "parallax" barrier array, an optical wedge and a prismatic optic as well as other radiation-steering component and a radiation-blocking component.

Figure 12A:
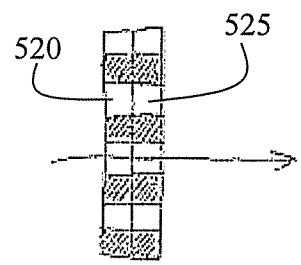
FIG. 12A and FIG. 12B, collectively referred to herein as FIG. 12, depict an effect of parallax barrier arrays.
Figure 12B:
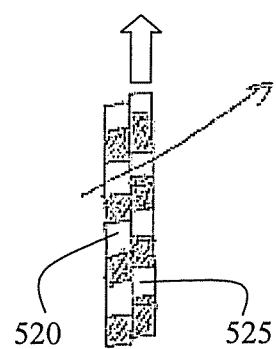

As an example, the use of parallax barrier arrays as scanning elements is shown in FIG. 12. In the embodiment depicted in FIG. 12, a first barrier array (520) and a second barrier array (525) are used in place of the first lenticular (320) and the second lenticular (325) for the scanning assembly. In FIG. 12A, the ray bundle proceeds directly through the scanning assembly, while in FIG. 12B, the ray bundle is steered by translation of the second barrier array (525).

Figure 13:
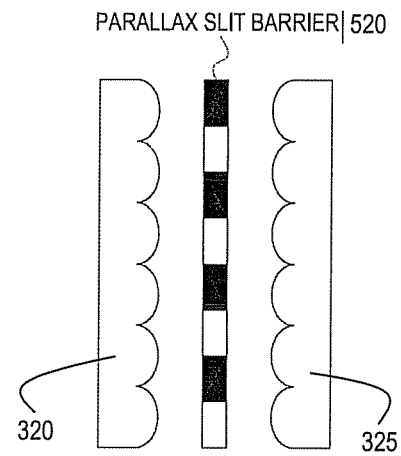
FIG. 13 depicts incorporation of a parallax slit barrier with a scanning assembly.

FIG. 13 depicts use of a single barrier array (520) in combination with the first lenticular array (320) and the second lenticular array (325). In this embodiment, the barrier array (520) typically includes an aperture associated with each lens that is designed to account for and minimize aberrations and crosstalk from adjacent pixels.

Figure 14:
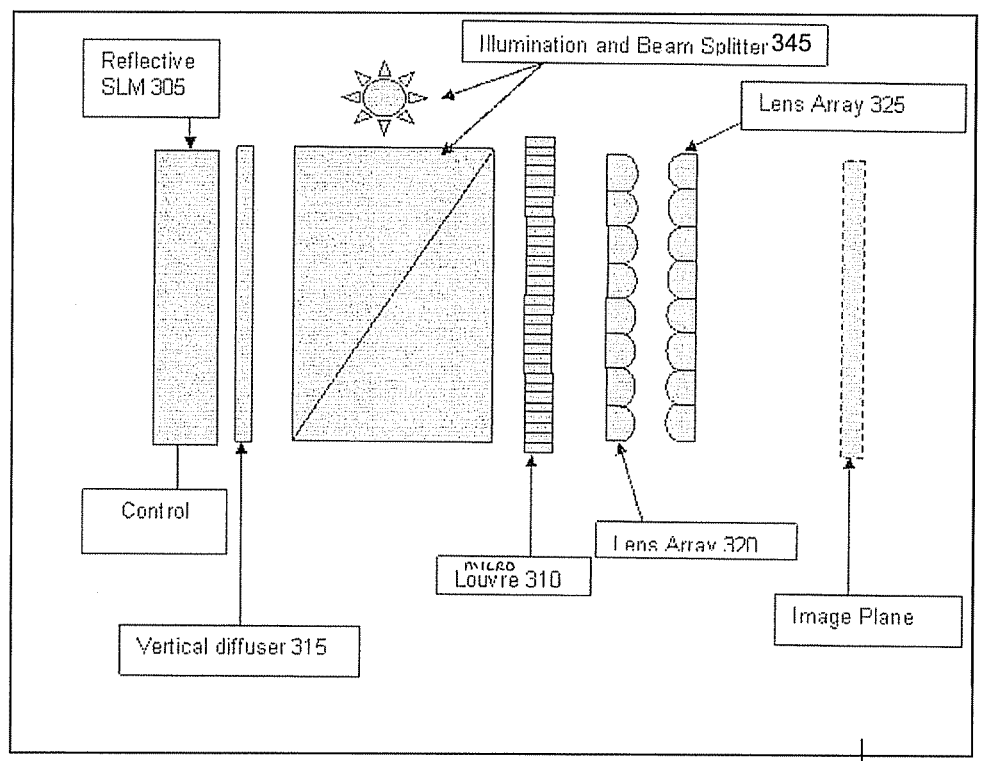
FIG. 14 depicts a further embodiment of the compact 3D display.

FIG. 14 depicts a further embodiment of the compact 3D display 20. In this embodiment, a beam splitter (345) is incorporated. Use of the beam splitter (345) provides for various advantages, such as the use of external illumination in combination with a reflective display. The use of external illumination may be useful for various purposes, such as to enhance brilliance in the image plane.

FIG. 15 depicts aspects of an exemplary embodiment of control electronics (261) for driving the compact 3D display (20). The control electronics (261) typically include the scanning assembly (55), where at least one of the first lenticular array (320) and the second lenticular array (325) are coupled to a motive force (60) for driving translational movement. In this embodiment, translation is controlled by a PID (proportional-integral-derivative) controller (80) that monitors the motion of the scaling assembly (55) using a diffractive motion encoder (81), and which, for example, drives a "voice coil" motor. The details of the PID control loop would be well-understood to those skilled in the field of servo control electronics and are therefore not discussed at length herein.

Typically, a core rendering electronics subassembly (82) assists in generating a sequence of 2-D perspective views projected by a fast SLM-based microdisplay (305). The core rendering electronics (82) also receives velocity and position data from the PID controller (80) control loop. In this case, the core rendering electronics (82) are slaved to the scanning assembly (55). Alternatively, the core rendering electronics (82) can act as master to the scanning assembly (55).

It is significant that the scanning assembly (55) undergoes time-varying optical properties, and that the SLM (305) is located adjacent to the scanning assembly (55) to shine light on or through the scanning assembly (55) in order to produce the 3D image.

It should be noted that the scanning assembly (55) may spend a significant interval of time at the extremes of a scan path. It is understood that, at least in some instances that if light passed through the screen during those intervals, the light would be too bright to be displayed properly. Therefore, "blank" (black) data are typically loaded into the 2D image source for the extreme views. As an illustration, for a sweep path having fifty positions, a forty-ninth clock is used to trigger a pre-load of a black screen for those views.

It should be noted that references to the term "lenticular" should be interpreted to include other methods for using spatial multiplexing to encode two or more views of a 3D image (10) into a single 2D field of pixels. These "panoramagrams" or "parallax displays" can use many optical devices to perform demultiplexing, such as lenticular sheets, parallax barriers, fly's-eye lens arrays, or holographic optical elements. The teachings herein generally provide for employing lenticular arrays and other optical arrays for a time-multiplexed manner rather than or in addition to a spatially-multiplexed manner.

Figure 16:
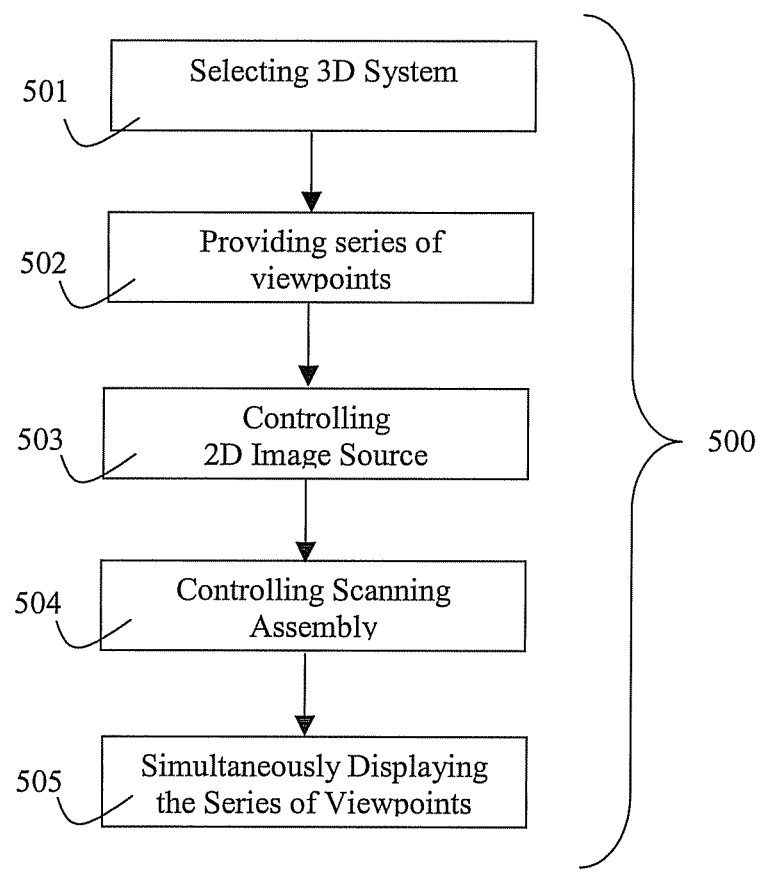
FIG. 16 depicts an exemplary method for generating a 3D image with the compact 3D display.

An exemplary method for providing the 3D image (10) is depicted in FIG. 16. Providing the 3D image (500) typically calls for selecting the 3D system (501), providing a series of viewpoints (502) to the 3D system (30), controlling the 2D image source (503), controlling the scanning assembly (504) for simultaneously displaying the series of viewpoints (505), thus providing the 3D image.

Selecting the 3D system (501) calls for selecting the 3D system (30) that includes appropriate components and features for producing the desired type of 3D image (10). For example, size, color, resolution, scan rate and other features may be considered when selecting the 3D system (501).

Providing the series of viewpoints (502) typically calls for assembling a series of viewpoints (90) produced in a manner that is generally consistent with the manner discussed above with reference to FIG. 3, or may involve some equivalent thereto. The series of viewpoints (90) is typically provided by electronics as depicted in FIG. 15, or by some equivalent thereto.

Controlling the 2D image source (503) and controlling the scanning assembly (504) similarly call for using the control electronics (261) to generate at least one 2D image in the spatial light modulator (305) and to drive the oscillatory translations of the optics.

When controlling the 2D image source (503) and controlling the scanning assembly (504) are properly executed, simultaneous displaying the series of viewpoints (505) is achieved, thus providing the 3D image (500).

Of course, with regard to the term "simultaneous", this should not be taken literally. That is, it should be recognized that scanning is required. However, in typical embodiments, the scan rate is fast enough to provide an illusion of the 3D image (10) to the unaided human eye. It should be recognized that observation of the 3D image (10) with other devices (such as a video camera) may alter or destroy the perception of a continuous display.

Stated another way, the oscillatory motion of at least one of the optical elements includes an oscillation of a high enough frequency that incremental display of each viewpoint (90) from the series of viewpoints is substantially completed within an integration period for the human eye.

One skilled in the art will recognize that methods for providing the 3D image (500) may vary greatly. For example, in one embodiment, controlling the 2D image source (503) and controlling the scanning assembly (504) calls for operating the 3D system (30) in the pupil-forming mode. In another embodiment, the controlling the 2D image source (503) and controlling the scanning assembly (504) calls for operating the 3D system (30) in the telecentric mode. Other embodiments contemplate operation of or accounting for certain additional components such as the microlouvers (310), the vertical diffuser (315) and other such aspects, some of which are described herein.

One skilled in the art will appreciate that the invention can be practiced by other than the described embodiments, which are presented for purposes of illustration and not of limitation. Thus, equivalents are envisioned and encompassed by this disclosure.

What is claimed is:

1. An apparatus, comprising:
a two-dimensional (2D) image source configured to project three or more selected viewpoints, wherein the three or more selected viewpoints are images with different perspectives of a scene that are generated from different positions using three or more cameras;
a first optic; and
a second optic configured to be periodically and repeatedly linearly translated relative to the first optic via a controller in first and second coplanar directions and in synchronization with the three or more selected viewpoints projected by the 2D image source to create three-dimensional (3D) imagery,
wherein the controller is configured to control linear translation of the second optic relative to the first optic in the first and second coplanar directions based at least in part on data received from a feedback control loop, and wherein the 2D image source, the first optic and the second optic are substantially close to or in contact with at least one other of the 2D image source, the first optic or the second optic.

2. The apparatus of claim 1, wherein the 2D image source comprises an illumination assembly and a spatial light modulator.

3. The apparatus of claim 1, further comprising:
a portable 3D display.

4. The apparatus of claim 1, further comprising:
at least one of a handheld media device, a mobile telephone, a personal digital assistant, an automotive dashboard mapping system, a global positioning system receiver, a personal gaming device, an MP3 player, a personal video player, or a notebook computer.

5. The apparatus of claim 1, further comprising:
a display comprising a rectangular display having a diagonal dimension in a range between about 1" (or about 25.4 mm) and about 24" (or about 610 mm).

6. The apparatus of claim 1, wherein the 2D image source comprises at least one of an organic light emitting diode display panel, an array of micro emitters, an array of vertical cavity surface emitting lasers, a reflective display, a transreflective display, an array of light emitting diodes (LEDs) or a switched LED display.

7. The apparatus of claim 1, wherein the 2D image source comprises illumination elements configured to provide predetermined wavelengths.

8. The apparatus of claim 1, wherein the 2D image source comprises a transmissive liquid crystal display (LCD) panel.

9. The apparatus of claim 8, wherein the transmissive LCD panel comprises at least one of a polarizing filter or an analyzing filter.

10. The apparatus of claim 1, wherein at least one of the first optic or the second optic comprises a lenticular lens array.

11. The apparatus of claim 10, wherein the lenticular lens array comprises a focal length of about 800 µm and a lens pitch of about 300 µm.

12. The apparatus of claim 10, wherein oscillatory translation of the second optic comprises a horizontal translation of about 125 µm.

13. The display apparatus of claim 1, wherein at least one of the first optic or the second optic comprises a holographic optical element, a hemispherical lens array, an irregular lens array, a parallax barrier array, an optical wedge, a prismatic optic, a radiation-steering component or a radiation-blocking component.

14. The display apparatus of claim 1, wherein the optical sandwich further comprises at least one of a vertical diffuser, a barrier array or a microlouver array.

15. The display apparatus of claim 14, wherein the vertical diffuser comprises a horizontal beam spread of about 0.1 degrees and a vertical beam spread of about 90 degrees.

16. The display apparatus of claim 14, wherein the barrier array comprises a barrier pitch that is approximately equal to a pixel pitch in a spatial light modulator of the 2D image source.

17. The display apparatus of claim 14, wherein the barrier array provides all increase in contrast for the 3D image.

18. The display apparatus of claim 1, wherein the 3D image comprises all of an image formed from between about 30 viewpoints to about 200 viewpoints.

19. The apparatus of claim 1, wherein the 2D image source, the first optic and the second optic comprise a display that is about 500 pixels by about 1000 pixels.

20. The apparatus of claim 1, wherein the 2D image source, the first optic and the second optic comprise a total image depth of about 4" (or about 10 mm).

21. The apparatus of claim 1, wherein the 3D image comprises about 256 colors.

22. The apparatus of claim 1, wherein the first optic comprises an oscillatory translatable optic.

23. The apparatus of claim 1, wherein a path for the second optic comprises a zig-zag path.

24. The apparatus of claim 1, wherein a path for the second optic comprises an indirect path that is not along the first and second coplanar directions.

25. The apparatus of claim 1, wherein the second optic is translated in an oscillatory manner relative to the first optic.

26. A method, comprising:
projecting a three-dimensional (3D) image by a display apparatus comprising a two-dimensional (2D) image source;
oscillatorily translating a scanning assembly comprising a first optic and a second optic, the 2D image source, the first optic and the second optic being substantially close to or in contact with at least one other of the 2D image source, the first optic or the second optic;
periodically and linearly translating at least one of the first optic and the second optic relative to one another and in synchronization with a series of three or more viewpoints received by the display apparatus to concurrently display the series of three or more viewpoints and project the 3D image, wherein the series of three or more viewpoints are images with different perspectives of a scene that are generated from a series of three or more positions using three or more cameras; and
controlling linear translation of at least one of the first optic and the second optic relative to one another based at least in part on data received from a feedback control loop.

27. The method of claim 26, further comprising controlling the 2D image source and the scanning assembly for one of a convergence mode and a telecentric mode.

28. The method of claim 26, further comprising controlling the 2D image source including loading blank data for one or more views of the scanning assembly.

29. The method of claim 26, wherein the periodically and linearly translating includes oscillating at least one of the first optic and the second optic relative to one another at a particular frequency to incrementally display a viewpoint from the series of viewpoints within an integration period for the human eye.

30. The method of claim 26, further comprising projecting the 3D image to a display surface.

31. The method of claim 26, further comprising projecting the 3D image as a time-multiplexed 3D image.

32. The method of claim 26, wherein the periodically and linearly translating includes translating in an oscillatory manner.

33. A non-transitory computer readable storage medium comprising computer executable instructions, comprising:
instructions for projecting a three-dimensional (3D) image by a display apparatus comprising a two-dimensional (2D) image source;
instructions for oscillatorily translating a scanning assembly comprising a first optic and a second optic, the 2D image source, the first optic and the second optic being substantially close to or in contact with at least one other of the 2D image source, the first optic or the second optic;
instructions for periodically and linearly translating at least one of the first optic and the second optic relative to one another and in synchronization with a series of three or more viewpoints received by the display apparatus to concurrently display the series of three or more viewpoints and project the 3D image, wherein the series of three or more viewpoints provide different depictions of a scene obtained using three or more differently positioned cameras; and
instructions for controlling linear translation of at least one of the first optic and the second optic relative to one another based at least in part on feedback data received from a control loop.

34. A system, comprising:
a two-dimensional (2D) image source configured to project a series of three or more viewpoints, wherein the series of three or more viewpoints provide different perspectives of a scene and are acquired from a series of three or more positions using three or more cameras;
a first optic; and
a second optic configured to be translated in an oscillatory manner relative to the first optic via a controller in first and second coplanar directions and in synchronization with the series of three or more viewpoints projected by the 2D image source to create three-dimensional (3D) imagery,
wherein the controller is configured to control linear translation of the second optic relative to the first optic in the first and second coplanar directions based at least in part on feedback data received from a control loop, and wherein the 2D image source, the first optic and the second optic are substantially to close to or in contact with at least one other of the 2D image source, the first optic or the second optic.

35. A system, comprising:
means for projecting a three-dimensional (3D) image by a display apparatus comprising a two-dimensional (2D) image source;
means for oscillatorily translating a scanning assembly comprising a first optic and a second optic, the 2D image source, the first optic and the second optic being substantially close to or in contact with at least one other of the 2D image source, the first optic or the second optic; and
means for periodically and linearly translating at least one of the first optic and the second optic relative to one another, based at least in part on feedback data received from a control loop, and in synchronization with a series of three or more viewpoints received by the display apparatus to concurrently display the series of three or more viewpoints and project the 3D image, wherein the series of three or more viewpoints are images that provide different depictions of a scene and are generated from a series of three or more positions using three or more cameras.

* * * * *